US011479118B2

(12) United States Patent
Imamura et al.

(10) Patent No.: US 11,479,118 B2
(45) Date of Patent: Oct. 25, 2022

(54) DRIVE APPARATUS FOR ELECTRIC-MOTOR FOUR-WHEEL DRIVE VEHICLE

(71) Applicant: SUBARU CORPORATION, Tokyo (JP)

(72) Inventors: Naohiro Imamura, Tokyo (JP); Takahito Inoh, Tokyo (JP); Koki Mitsumoto, Tokyo (JP); Mamoru Murakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 246 days.

(21) Appl. No.: 16/998,164

(22) Filed: Aug. 20, 2020

(65) Prior Publication Data
US 2021/0086612 A1 Mar. 25, 2021

(30) Foreign Application Priority Data
Sep. 25, 2019 (JP) .............................. JP2019-173732

(51) Int. Cl.
*B60K 17/348* (2006.01)
*B60K 17/356* (2006.01)
(Continued)

(52) U.S. Cl.
CPC .............. *B60K 17/356* (2013.01); *B60K 1/02* (2013.01); *B60K 17/342* (2013.01);
(Continued)

(58) Field of Classification Search
CPC ...... B60K 17/356; B60K 1/02; B60K 17/342; B60K 17/348; B60K 17/354; B60K 23/08;
(Continued)

(56) References Cited

U.S. PATENT DOCUMENTS

| 2014/0284130 A1 | 9/2014 | Knoblauch |
| 2017/0305257 A1* | 10/2017 | Ruan .................. F16H 3/091 |
| 2017/0327000 A1 | 11/2017 | Wada et al. |

FOREIGN PATENT DOCUMENTS

| DE | 102016218717 B3 * | 2/2018 | ............... B60K 1/02 |
| JP | 2015-506862 A | 3/2015 | |

(Continued)

*Primary Examiner* — Justin Holmes
(74) *Attorney, Agent, or Firm* — Troutman Pepper Hamilton Sanders LLP

(57) ABSTRACT

The invention includes first and second motors, first and second differential mechanisms, and first to eighth decoupling mechanisms. The first and second motors transmit power to left and right wheels. First differential mechanisms distribute the power from the first and second motors. The first and second mechanisms are interposed between the first differential mechanism and the left front wheel and between the differential mechanism and the left rear wheel. The third and fourth decoupling mechanisms are interposed between the first motor and the first decoupling mechanism and between the first motor and the second decoupling mechanism. The fifth and sixth decoupling mechanisms are interposed between the second differential mechanism and the right front wheel and the right rear wheel, respectively. The seventh and eighth decoupling mechanisms are interposed between the second motor and the fifth decoupling mechanism and between the second motor and the sixth decoupling mechanism.

18 Claims, 10 Drawing Sheets

(51) Int. Cl.
*B60K 1/02* (2006.01)
*B60K 23/08* (2006.01)
*B60K 17/354* (2006.01)
*B60K 17/342* (2006.01)

(52) U.S. Cl.
CPC .......... *B60K 17/348* (2013.01); *B60K 17/354* (2013.01); *B60K 23/08* (2013.01)

(58) Field of Classification Search
CPC ................. B60K 17/02; B60K 17/043; B60K 2007/0061; B60K 2023/043; B60K 2023/0825; B60K 2023/0833; B60K 7/0007; B60K 17/346; B60K 17/3462; B60Y 2400/421
See application file for complete search history.

(56) References Cited

FOREIGN PATENT DOCUMENTS

| JP | 2016-93020 A | 5/2015 | |
| WO | WO-2013091763 A1 * | 6/2013 | ............... B60K 1/02 |

* cited by examiner

FIG. 2

| | FIRST STATE | SECOND STATE | THIRD STATE | FOURTH STATE | FIFTH STATE |
|---|---|---|---|---|---|
| FIRST MOTOR | ON | ON | ON | ON | ON |
| SECOND MOTOR | ON | ON | ON | ON | ON |
| FIRST DECOUPLING MECHANISM | COUPLED (✓) | COUPLED (✓) | DECOUPLED (✗) | COUPLED (✓) | COUPLED (✓) |
| SECOND DECOUPLING MECHANISM | COUPLED (✓) | COUPLED (✓) | COUPLED (✓) | DECOUPLED (✗) | DECOUPLED (✗) |
| THIRD DECOUPLING MECHANISM & FOURTH DECOUPLING MECHANISM | COUPLED (✓) | DECOUPLED (✗) | DECOUPLED (✗) OR COUPLED (✓) | DECOUPLED (✗) OR COUPLED (✓) | DECOUPLED (✗) OR COUPLED (✓) |
| FIFTH DECOUPLING MECHANISM | COUPLED (✓) | COUPLED (✓) | DECOUPLED (✗) | COUPLED (✓) | DECOUPLED (✗) |
| SIXTH DECOUPLING MECHANISM | COUPLED (✓) | COUPLED (✓) | COUPLED (✓) | DECOUPLED (✗) | COUPLED (✓) |
| SEVENTH DECOUPLING MECHANISM & EIGHTH DECOUPLING MECHANISM | COUPLED (✓) | DECOUPLED (✗) | DECOUPLED (✗) OR COUPLED (✓) | DECOUPLED (✗) OR COUPLED (✓) | DECOUPLED (✗) OR COUPLED (✓) |

DRIVE APPARATUS FOR ELECTRIC-MOTOR FOUR-WHEEL DRIVE VEHICLE

CROSS-REFERENCE TO RELATED APPLICATIONS

The present application claims priority from Japanese Patent Application No. 2019-173732 filed on Sep. 25, 2019, the entire contents of which are hereby incorporated by reference.

BACKGROUND

The disclosure relates to drive system techniques of electric vehicles driven by electric motors and, in particular, relates to a drive apparatus for an electric-motor four-wheel drive vehicle driving front and rear wheels with a plurality of electric motors.

For an electric vehicle driven by electric motors, a four-wheel drive system has been known in which all of four wheels serve as drive wheels (see, for example, Japanese Unexamined Patent Application Publication (Translation of PCT Application) (JP-T) No. 2015-506862 and Japanese Unexamined Patent Application Publication (JP-A) No. 2016-93020).

SUMMARY

An aspect of the disclosure provides a drive apparatus for an electric-motor four-wheel drive vehicle. The drive apparatus includes a first motor capable, a second motor, a first differential mechanism, a second differential mechanism, a first decoupling mechanism, a second decoupling mechanism, a third decoupling mechanism, a fourth decoupling mechanism, a fifth decoupling mechanism, a sixth decoupling mechanism, a seventh decoupling mechanism, an eighth decoupling mechanism. The first motor is capable of transmitting power to a left front wheel and a left rear wheel. The second motor is capable of transmitting power to a right front wheel and a right rear wheel. The first differential mechanism is coupled to the first motor. The first differential mechanism is configured to distribute the power from the first motor to the left front wheel and the left rear wheel. The second differential mechanism is coupled to the second motor. The second differential mechanism is configured to distribute the power from the second motor to the right front wheel and the right rear wheel. The first decoupling mechanism is interposed between the first differential mechanism and the left front wheel. The second decoupling mechanism is interposed between the first differential mechanism and the left rear wheel. The third decoupling mechanism is interposed between the first motor and the first decoupling mechanism. The third decoupling mechanism is capable of directly coupling the first motor and the left front wheel to each other. The fourth decoupling mechanism is interposed between the first motor and the second decoupling mechanism. The fourth decoupling mechanism is capable of directly coupling the first motor and the left rear wheel to each other. The fifth decoupling mechanism is interposed between the second differential mechanism and the right front wheel. The sixth decoupling mechanism is interposed between the second differential mechanism and the right rear wheel. The seventh decoupling mechanism is interposed between the second motor and the fifth decoupling mechanism. The seventh decoupling mechanism is capable of directly coupling the second motor and the right front wheel to each other. The eighth decoupling mechanism is interposed between the second motor and the sixth decoupling mechanism. The eighth decoupling mechanism is capable of directly coupling the second motor and the right rear wheel to each other.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a state comparison table illustrating states of control on each of electric motors and each of decoupling mechanisms by a controller.

DETAILED DESCRIPTION

JP-T No. 2015-506862 discloses a technique in which propeller shafts are employed to transmit driving force from electric motors to front wheels and rear wheels. The propeller shafts occupy extra space in the center of a vehicle cabin, thereby reducing roominess of the interior of the vehicle cabin. When torque vectoring of left and right wheels is performed as an element to improve steerability, the configuration disclosed in JP-T No. 2015-506862 limits the torque vectoring to one of the front wheel and the rear wheel.

JP-A No. 2016-93020 discloses a technique in which electromagnetic clutches are disposed in joints between wheels and axles to implement drive by either of front wheels and rear wheels. However, the technique cannot be regarded as having achieved efficient transmission of driving force from electric motors to drive wheels while improving steerability.

It is desirable to provide a drive apparatus for an electric-motor four-wheel drive vehicle that can efficiently transmit driving force from electric motors to drive wheels and that can also improve steerability.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, for convenience, a vehicle height direction of an electric-motor four-wheel drive vehicle 100 is defined as a Z direction, a vehicle longitudinal direction of the vehicle 100 is defined as a Y direction, and a vehicle width direction of the vehicle 100 perpendicular to the Z direction and the Y direction is defined as an X direction. Needless to say, however, this definition of the directions is not to affect the embodiments of the disclosure and is not to unduly narrow the scope of the appended claims. The rest of a configuration detailed below may be suitably complemented with known techniques including those disclosed in the above-described patent literatures.

First Embodiment

Electric-Motor Four-Wheel Drive Vehicle 100

First, a configuration of the electric-motor four-wheel drive vehicle 100 according to a first embodiment of the disclosure will be described with reference to FIG. 1.

Figure 1:
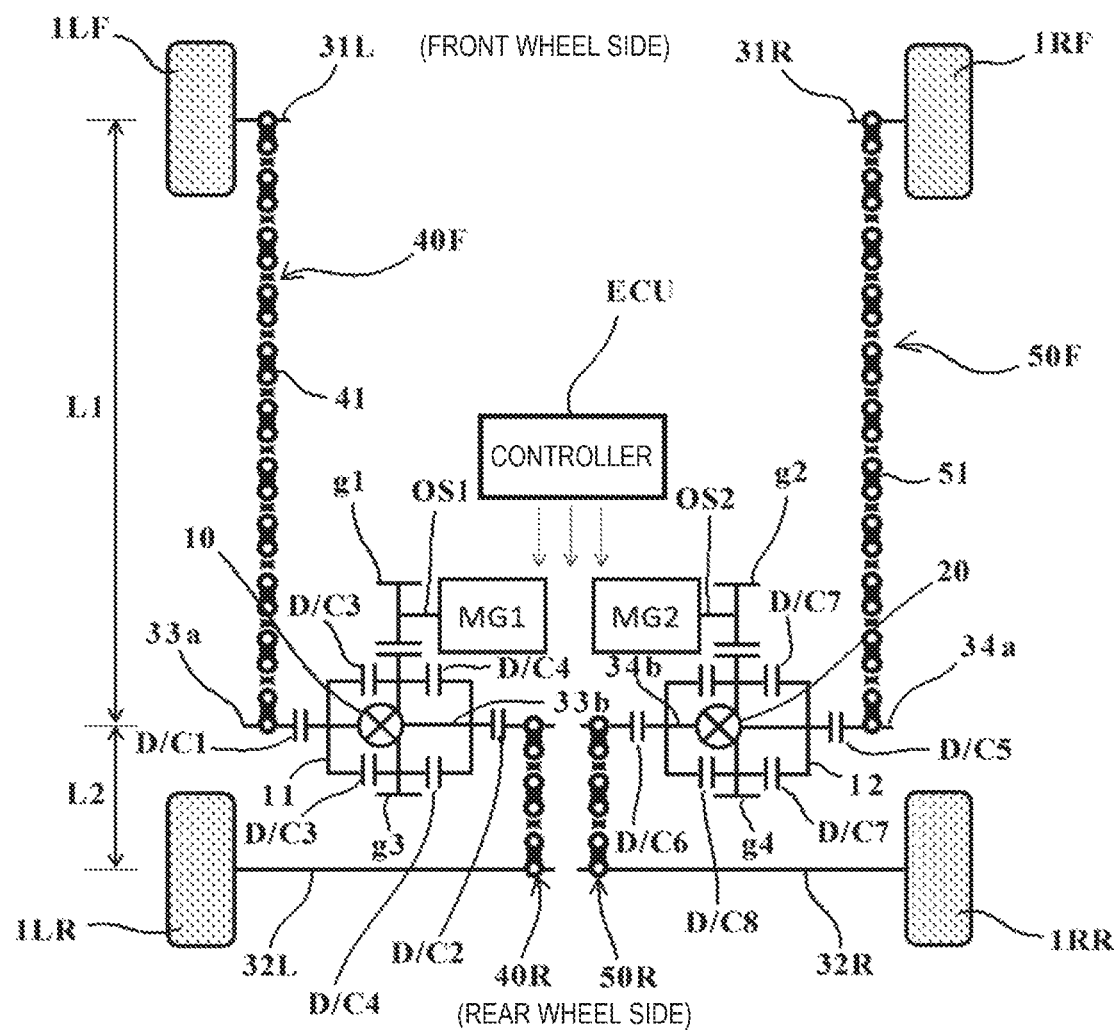
FIG. 1 is a block diagram illustrating a driving force transmission system in an electric-motor four-wheel drive vehicle according to a first embodiment.

As illustrated in FIG. 1, the electric-motor four-wheel drive vehicle 100 according to this embodiment is an electric vehicle with drive wheels 1 driven by electric motors MG. The electric-motor four-wheel drive vehicle 100 includes the first motor MG1, the second motor MG2, a first differential mechanism 10, a second differential mechanism 20, decoupling mechanisms D/C (that is, a first decoupling mechanism D/C1, a second decoupling mechanism D/C2, a third decoupling mechanism D/C3, a fourth decoupling mechanism D/C4, a fifth decoupling mechanism D/C5, a sixth decoupling mechanism D/C6, a seventh decoupling mechanism D/C7, and an eighth decoupling mechanism D/C8), and a controller ECU.

The drive wheels 1 according to this embodiment include a right front wheel 1RF and a left front wheel 1LF that constitute a front wheel side, and a right rear wheel 1RR and a left rear wheel 1LR that constitute a rear wheel side.

On the front wheel side, as illustrated in FIG. 1, the left front wheel 1LF is coupled to a left front axle 31L, described later, and is coupled to a first intermediate shaft 33a via the left front axle 31L and a first sprocket mechanism 40F. The right front wheel 1RF is coupled to a right front axle 31R, described later, and is coupled to a second intermediate shaft 34a via the right front axle 31R and a second sprocket mechanism 50F.

On the rear wheel side, as illustrated in FIG. 1, the left rear wheel 1LR is coupled to a left rear axle 32L, described later, and is coupled to the first intermediate shaft 33b via the left rear axle 32L and a first sprocket mechanism 40R. The right rear wheel 1RR is coupled to a right rear axle 32R, described later, and is coupled to the second intermediate shaft 34b via the right rear axle 32R and a second sprocket mechanism 50R.

The first motor MG1 is capable of transmitting power to the left front wheel 1LF and the left rear wheel 1LR. As a specific example of the first motor MG1, a known synchronous motor controlled via a component such as an inverter, not illustrated, may be applied.

The second motor MG2 is capable of transmitting power to the right front wheel 1RF and the right rear wheel 1RR. As a specific example of the second motor MG2, a known synchronous motor may be applied in a similar manner to the first motor MG1.

As obviously understood from FIG. 1 and other drawings, the first motor MG1 and the second motor MG2 according to this embodiment are interposed in a space from drive shafts (31L and 31R described above) of the left front wheel 1LF and the right front wheel 1RF to drive shafts (32L and 32R described above) of the left rear wheel 1LR and the right rear wheel 1RR in some examples. Such a midship arrangement of each of the electric motors can further improve steerability.

According to this embodiment, output shafts (OS1 and OS2) of the first motor MG1 and the second motor MG2 are respectively disposed in parallel to the drive shafts (31L and 31R) of the left front wheel 1LF and the right front wheel 1RF in some examples. In other words, the output shafts (OS1 and OS2) are also respectively disposed in parallel to the drive shafts (32L and 32R) of the left rear wheel 1LR and the right rear wheel 1RR. Thus, without involving orthogonal gears, application of spur gears enables highly efficient transmission of driving force generated by the motors.

It is noted that according to this embodiment, the output shafts (OS1 and OS2) are disposed in a straight line to be parallel to each other.

Moreover, according to this embodiment, the first motor MG1 serves to drive the left wheel side while the second motor MG2 serves to drive the right wheel side so that the outputs of the respective motors are adjusted to implement a torque vectoring function of the left and right wheels. At this time, in some embodiments, a maximum output (rated output) of the second motor MG2 is equal to a maximum output (rated output) of the first motor MG1 in terms of balance. However, the maximum outputs of the first motor MG1 and the second motor MG2 may not necessarily be the same but different.

The first differential mechanism 10 according to this embodiment is coupled to the first motor MG1 and distributes power from the first motor MG1 to the left front wheel 1LF and the left rear wheel 1LR.

The first differential mechanism 10 functions to provide differential rotation between the front wheel and the rear wheel on the left wheel side so that at the time of turning, for example, the left front wheel 1LF and the left rear wheel 1LR can be made different in rotational speed. For example, in a known differential case (not illustrated), the first differential mechanism 10 according to this embodiment is disposed inside of a hollow cylindrical member 11 having an outer peripheral surface on which a ring gear g3 is disposed. In this differential case, a side gear (not illustrated) is disposed on each of left and right sides. The left and right side gears are respectively coupled to the first intermediate shaft 33a coupled to the first sprocket mechanism 40F on the front wheel side and to the first intermediate shaft 33b coupled to the first sprocket mechanism 40R on the rear wheel side. To mesh with the left and right side gears, two pinion gears (not illustrated) are provided.

According to this embodiment, the third decoupling mechanism D/C3 and the fourth decoupling mechanism D/C4, described later, are disposed on the hollow cylindrical member 11. The ring gear g3 is positioned between the third decoupling mechanism D/C3 and the fourth decoupling mechanism D/C4. An end portion of the hollow cylindrical member 11 on the third decoupling mechanism D/C3 side is coupled to the first intermediate shaft 33a. An end portion of the hollow cylindrical member 11 on the fourth decoupling mechanism D/C4 side is coupled to the first intermediate shaft 33b.

The ring gear g3 disposed on the outer peripheral surface of the hollow cylindrical member 11 is disposed to mesh with a first gear g1 interlocked with the output shaft OS1 of the first motor MG1.

The second differential mechanism 20 according to this embodiment is coupled to the second motor MG2 and distributes power from the second motor MG2 to the right front wheel 1RF and the right rear wheel 1RR.

The second differential mechanism 20 functions to provide differential rotation between the front wheel and the rear wheel on the right wheel side so that at the time of turning, for example, the right front wheel 1RF and the right rear wheel 1RR can be made different in rotational speed. For example, in a known differential case (not illustrated), in a similar manner to the first differential mechanism 10, the second differential mechanism 20 according to this embodiment is disposed inside of a hollow cylindrical member 12 having an outer peripheral surface on which a ring gear g4 is disposed. In this differential case, a side gear (not illustrated) is disposed on each of left and right sides. The left and right side gears are respectively coupled to the second intermediate shaft 34a coupled to the second sprocket mechanism 50F on the front wheel side and to the second intermediate shaft 34b coupled to the second sprocket mechanism 50R on the rear wheel side. To mesh with the left and right side gears, two pinion gears (not illustrated) are provided.

According to this embodiment, the seventh decoupling mechanism D/C7 and the eighth decoupling mechanism D/C8, described later, are disposed on the hollow cylindrical member 12. The ring gear g4 is positioned between the seventh decoupling mechanism D/C7 and the eighth decoupling mechanism D/C8. An end portion of the hollow cylindrical member 12 on the seventh decoupling mechanism D/C7 side is coupled to the second intermediate shaft 34a. An end portion of the hollow cylindrical member 12 on the eighth decoupling mechanism. D/C8 side is coupled to the second intermediate shaft 34b.

The ring gear g4 disposed on the outer peripheral surface of the hollow cylindrical member 12 is disposed to mesh with a second gear g2 interlocked with the output shaft OS2 of the second motor MG2.

The first decoupling mechanism D/C1 is disposed on the first intermediate shaft 33a interposed between the first differential mechanism 10 and the left front wheel 1LF. More specifically, the first decoupling mechanism D/C1 according to this embodiment generates two states under control of the controller ECU, described later. One of the two states is a coupled state in which the first differential mechanism 10 or the hollow cylindrical member 11 and the left front wheel 1LF are coupled to each other, whereby driving force is transmittable. The other is a decoupled state in which the first differential mechanism 10 or the hollow cylindrical member 11 and the left front wheel 1LF are decoupled from each other, whereby no driving force is transmitted.

Examples of a specific configuration of the first decoupling mechanism D/C1 may include a known clutch mechanism such as a dog clutch, and a disconnection mechanism as exemplified in JP-A No. 2018-17354.

The second decoupling mechanism. D/C2 is disposed on the first intermediate shaft 33b interposed between the first differential mechanism 10 and the left rear wheel 1LR. More specifically, the second decoupling mechanism D/C2 according to this embodiment generates two states under control of the controller ECU, described later. One of the two states is a coupled state in which the first differential mechanism 10 or the hollow cylindrical member 11 and the left rear wheel 1LR are coupled to each other, whereby driving force is transmittable. The other is a decoupled state in which the first differential mechanism 10 or the hollow cylindrical member 11 and the left rear wheel 1LR are decoupled from each other, whereby no driving force is transmitted.

As a specific configuration of the second decoupling mechanism D/C2, substantially the same configuration as the first decoupling mechanism D/C1 such as a known clutch mechanism may be employed.

The third decoupling mechanism D/C3 is interposed between the first motor MG1 and the first decoupling mechanism D/C1 so that the first motor MG1 and the left front wheel 1LF can be directly coupled to each other.

More specifically, the third decoupling mechanism D/C3 according to this embodiment is disposed on the hollow cylindrical member 11 and restricts the differential function of the first differential mechanism 10 under control of the controller ECU, described later, so that driving force from the first motor MG1 can be directly transmitted to the left front wheel 1LF.

As a specific configuration of the third decoupling mechanism D/C3, substantially the same configuration as, for example, the first decoupling mechanism D/C1 such as a known clutch mechanism may be employed.

The fourth decoupling mechanism D/C4 is interposed between the first motor MG1 and the second decoupling mechanism D/C2 so that the first motor MG1 and the left rear wheel 1LR can be directly coupled to each other.

More specifically, the fourth decoupling mechanism D/C4 according to this embodiment is disposed on the hollow cylindrical member 11 and restricts the differential function of the first differential mechanism 10 under control of the controller ECU, described later, so that driving force from the first motor MG1 can be directly transmitted to the left rear wheel 1LR.

As a specific configuration of the fourth decoupling mechanism D/C4, substantially the same configuration as, for example, the first decoupling mechanism D/C1 such as a known clutch mechanism may be employed.

It is noted that with the left front wheel 1LF and the left rear wheel 1LR being directly coupled to the first motor MG1, the same torque is transmitted from the electric motor to the front and rear wheels on the left wheel side.

The fifth decoupling mechanism D/C5 is disposed on the second intermediate shaft 34a interposed between the second differential mechanism. 20 and the right front wheel 1RF. More specifically, the fifth decoupling mechanism D/C5 according to this embodiment generates two states under control of the controller ECU, described later. One of the two states is a coupled state in which the second differential mechanism 20 or the hollow cylindrical member 12 and the right front wheel 1RF are coupled to each other, whereby driving force is transmittable. The other is a decoupled state in which the second differential mechanism 20 or the hollow cylindrical member 12 and the right front wheel 1RF are decoupled from each other, whereby no driving force is transmitted.

Examples of a specific configuration of the fifth decoupling mechanism D/C5 may include a known clutch mechanism such as a dog clutch, and a disconnection mechanism as exemplified in JP-A No. 2018-17354.

The sixth decoupling mechanism D/C6 is disposed on the second intermediate shaft 34b interposed between the second differential mechanism 20 and the right rear wheel 1RR. More specifically, the sixth decoupling mechanism D/C6 according to this embodiment generates two states under control of the controller ECU, described later. One of the two states is a coupled state in which the second differential mechanism 20 or the hollow cylindrical member 12 and the right rear wheel 1RR are coupled to each other, whereby driving force is transmittable. The other is a decoupled state in which the second differential mechanism 20 or the hollow cylindrical member 12 and the right rear wheel 1RR are decoupled from each other, whereby no driving force is transmitted.

As a specific configuration of the sixth decoupling mechanism D/C6, substantially the same configuration as the first decoupling mechanism D/C1 such as a known clutch mechanism may be employed.

The seventh decoupling mechanism D/C7 is interposed between the second motor MG2 and the fifth decoupling mechanism D/C5 so that the second motor MG2 and the right front wheel 1RF can be directly coupled to each other.

More specifically, the seventh decoupling mechanism D/C7 according to this embodiment is disposed on the hollow cylindrical member 12 and restricts the differential function of the second differential mechanism 20 under control of the controller ECU, described later, so that driving force from the second motor MG2 can be directly transmitted to the right front wheel 1RF.

As a specific configuration of the seventh decoupling mechanism D/C7, substantially the same configuration as, for example, the first decoupling mechanism D/C1 such as a known clutch mechanism may be employed.

The eighth decoupling mechanism D/C8 is interposed between the second motor MG2 and the sixth decoupling mechanism D/C6 so that the second motor MG2 and the right rear wheel 1RR can be directly coupled to each other.

More specifically, the eighth decoupling mechanism D/C8 according to this embodiment is disposed on the hollow cylindrical member 12 and restricts the differential function of the second differential mechanism 20 under control of the controller ECU, described later, so that driving force from the second motor MG2 can be directly transmitted to the right rear wheel 1RR.

As a specific configuration of the eighth decoupling mechanism D/C8, substantially the same configuration as, for example, the first decoupling mechanism D/C1 such as a known clutch mechanism may be employed.

It is noted that with the right front wheel 1RF and the right rear wheel 1RR being directly coupled to the second motor MG2, the same torque is transmitted from the electric motor to the front and rear wheels on the right wheel side.

The first intermediate shaft 33 (specifically, 33a and 33b described above) is interposed in a space from the first motor MG1 to the left front wheel 1LF and the left rear wheel 1LR. This first intermediate shaft 33 relays driving force from the first motor MG1 and transmits the driving force to the left front wheel 1LF and the left rear wheel 1LR. One of the side gears of the first differential mechanism 10 is coupled to one end (first end) of the first intermediate shaft 33a of the first intermediate shaft 33 whereas the first sprocket mechanism 40F, described later, is coupled to the other end (second end) of the first intermediate shaft 33a. The other of the side gears of the first differential mechanism 10 is coupled to one end (first end) of the first intermediate shaft 33b whereas the first sprocket mechanism. 40R, described later, is coupled to the other end (second end) of the first intermediate shaft 33b.

The second intermediate shaft 34 (specifically, 34a and 34b described above) is interposed in a space from the second motor MG2 to the right front wheel 1RF and the right rear wheel 1RR. This second intermediate shaft 34 relays driving force from the second motor MG2 and transmits the driving force to the right front wheel 1RF and the right rear wheel 1RR. One of the side gears of the second differential mechanism 20 is coupled to one end of the second intermediate shaft 34a of the second intermediate shaft 34 whereas the second sprocket mechanism 50F, described later, is coupled to the other end of the second intermediate shaft 34a. The other of the side gears of the second differential mechanism 20 is coupled to one end of the second intermediate shaft 34b whereas the second sprocket mechanism 50R, described later, is coupled to the other end of the second intermediate shaft 34b.

The first sprocket mechanisms 40 include the first sprocket mechanism 40F interposed between the first intermediate shaft 33a and the left front wheel 1LF, and the first sprocket mechanism 40R interposed between the first intermediate shaft 33b and the left rear wheel 1LR. More specifically, each of the first sprocket mechanisms 40 according to this embodiment is implemented by a known chain and sprocket mechanism including a chain 41 and sprockets, not illustrated. In this embodiment, the chain is employed as a power transmitting member of the first sprocket mechanism 40. However, the chain may be replaced with other known power transmitting members such as a belt.

Via such a first sprocket mechanism 40, driving force from the first motor MG1 is transmitted to each of the left front wheel 1LF and the left rear wheel 1LR.

The second sprocket mechanisms 50 include the second sprocket mechanism 50F interposed between the second intermediate shaft 34a and the right front wheel 1RF, and the second sprocket mechanism 50R interposed between the second intermediate shaft 34b and the right rear wheel 1RR. More specifically, in a similar manner to the first sprocket mechanisms 40, each of the second sprocket mechanisms 50 according to this embodiment is implemented by a known chain and sprocket mechanism including a chain 51 and sprockets, not illustrated. In this embodiment, the chain is employed as a power transmitting member of the second sprocket mechanism 50. However, the chain may be replaced with other known power transmitting members such as a belt.

Via such a second sprocket mechanism 50, driving force from the second motor MG2 is transmitted to each of the right front wheel 1RF and the right rear wheel 1RR.

As illustrated in FIG. 1, in some embodiments, a length L1 of the first sprocket mechanism 40F in the vehicle longitudinal direction is greater than a length L2 of the first sprocket mechanism. 40R in the vehicle longitudinal direction. This makes it possible to dispose the electric motors and other components on a rear side of the vehicle so as to efficiently secure usable space in the vehicle cabin.

In this embodiment, the front and rear wheels on the left side receive driving force transmitted from the first intermediate shaft 33 via the respective sprocket mechanisms. However, this is not to be construed in a limiting sense. For example, while the first sprocket mechanism 40F is applied to the left front wheel 1LF, driving force may be transmitted to the left rear wheel 1LR using a known gear mechanism. In such a manner, the sprocket mechanism may be applied to at least one of the front wheel or the rear wheel.

Similarly, in some embodiments, the length L1 of the second sprocket mechanism 50F in the vehicle longitudinal direction is greater than the length L2 of the second sprocket mechanism 50R in the vehicle longitudinal direction. This makes it possible to dispose the electric motors and other components on the rear side of the vehicle so as to efficiently secure usable space in the vehicle cabin.

Similarly, in this embodiment, the front and rear wheels on the right side receive driving force transmitted from the second intermediate shaft 34 via the respective sprocket mechanisms. However, for example, while the second sprocket mechanism 50F is applied to the right front wheel 1RF, driving force may be transmitted to the right rear wheel 1RR using a known gear mechanism. In such a manner, the sprocket mechanism may be applied to at least one of the front wheel or the rear wheel.

Details of Configuration of Driving Force Transmission System

As illustrated in FIG. 1, in this embodiment, a first gear g1 composed of a spur gear is disposed on the output shaft OS1 of the first motor MG1. This first gear g1 meshes with the ring gear g3 of the hollow cylindrical member 11. The hollow cylindrical member 11 and the first intermediate shafts 33a and 33b are integrally rotatable. Consequently, when driving force from the first motor MG1 is transmitted to the ring gear g3 via the first gear g1, the hollow cylindrical member 11 rotates along with the first intermediate shaft 33.

As described above, the first sprocket mechanism 40F is coupled to the second end of the first intermediate shaft 33a. Therefore, in accordance with rotation of the first intermediate shaft 33a, the intervening first sprocket mechanism 40F causes the drive shaft (left front axle 31L) of the left front wheel 1LF to also rotate.

With the above-described configuration, driving force from the first motor MG1 can be transmitted to the left front wheel 1LF via the first sprocket mechanism 40F.

As described above, the first sprocket mechanism 40R is coupled to the second end of the first intermediate shaft 33b. Therefore, in accordance with rotation of the first intermediate shaft 33b, the intervening first sprocket mechanism 40R causes the drive shaft (left rear axle 32L) of the left rear wheel 1LR to also rotate.

With the above-described configuration, driving force from the first motor MG1 can be transmitted to the left rear wheel 1LR via the first sprocket mechanism 40R.

Moreover, as illustrated in FIG. 1, in this embodiment, the first differential mechanism 10 is disposed on the first intermediate shaft 33 so as to transmit driving force from the first motor MG1 to the left front wheel 1LF and the left rear wheel 1LR respectively via the first sprocket mechanisms 40F and 40R while allowing differential rotation between the left front wheel 1LF and the left rear wheel 1LR.

Since the above description similarly applies to the right-side drive wheels, detailed description on a driving force transmission system of the right-side drive wheels will be omitted.

In this embodiment, the second differential mechanism 20 is disposed on the second intermediate shaft 34 so as to transmit driving force from the second motor MG2 to the right front wheel 1RF and the right rear wheel 1RR respectively via the second sprocket mechanisms 50F and 50R while allowing differential rotation between the right front wheel 1RF and the right rear wheel 1RR.

As illustrated in FIG. 1, in this embodiment, driving force from the first motor MG1 is transmitted to the left front wheel 1LF and the left rear wheel 1LR whereas driving force from the second motor MG2 is transmitted to the right front wheel 1RF and the right rear wheel 1RR in an independent manner from the left-side wheels.

Consequently, the controller ECU, described later, adjusts magnitudes of torques (driving force) from the first motor MG1 and the second motor MG2, thereby enabling torque vectoring of the left and right wheels.

Torque Distribution Control by Controller ECU

Next, referring to FIG. 2, torque distribution control by the controller ECU according to this embodiment will be detailed.

The controller ECU according to this embodiment includes processors, such as a central processing unit (CPU) or a micro processing unit (MPU), electric circuits, and storage elements, such as a random access memory (RAM) and a read only memory (ROM). The controller ECU controls the first motor MG1 and the second motor MG2 via an inverter, not illustrated, and includes components such as a known vehicle dynamics control (VDC) unit to control vehicle behavior. The control units of various kinds mutually exchange control information and control parameter information via an in-vehicle network (such as CAN) formed of a communication bus to perform motor driving force control and vehicle behavior control, for example. The control information includes various kinds of calculated values. The control parameter information is detected by various kinds of sensors such as a vehicle speed sensor.

Moreover, the controller ECU controls the driving force transmission system to implement appropriate torque distribution relative to the front and rear drive wheels 1. For example, the controller ECU according to this embodiment controls decoupled states and coupled states of the first decoupling mechanism D/C1, the second decoupling mechanism D/C2, the third decoupling mechanism D/C3, the fourth decoupling mechanism D/C4, the fifth decoupling mechanism D/C5, the sixth decoupling mechanism D/C6, the seventh decoupling mechanism D/C7, and the eighth decoupling mechanism D/C8.

FIG. 2 illustrates an example of the control by the controller ECU.

As illustrated in this table, the controller ECU controls output states of the first motor MG1 and the second motor MG2, and decoupling and coupling of each of the first decoupling mechanism D/C1 to the eighth decoupling mechanism D/C8.

Examples of the control in specific travel conditions or specific travel states will be described below with reference to FIGS. 3 to 7.

First State

Figure 3:
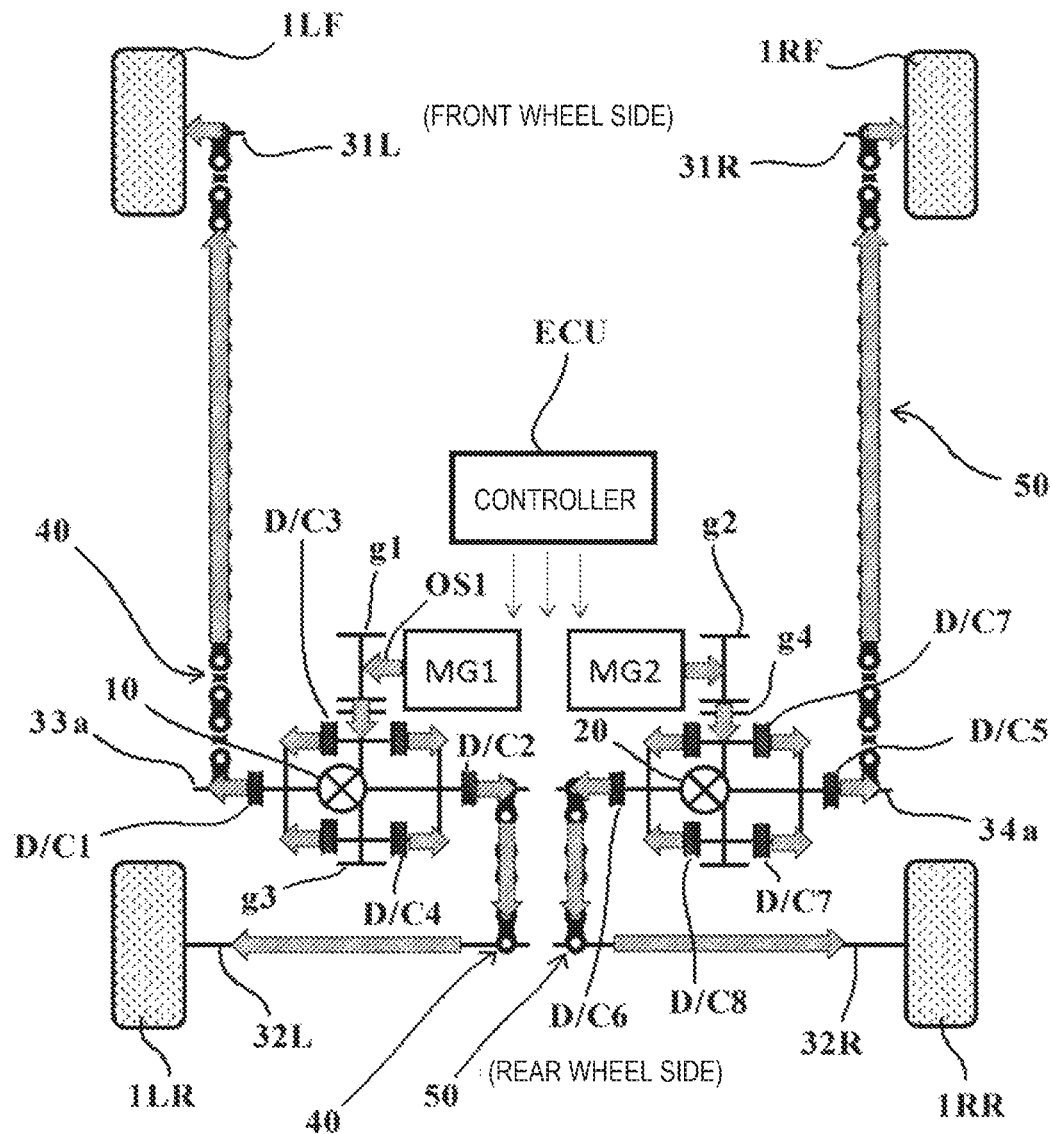
FIG. 3 is a diagram schematically illustrating how driving force from the electric motors is transmitted to drive wheels in a first state.

As illustrated in FIG. 2, as a first state, all-wheel drive (AWD) travel may be exemplified in which all of the drive wheels 1 are in directly coupled states in the electric-motor four-wheel drive vehicle 100. FIG. 3 illustrates a transmission state of driving force from the electric motors and a torque distribution state in the first state.

As obviously understood from these diagrams, the controller ECU controls all of the first decoupling mechanism D/C1 to the eighth decoupling mechanism D/C8 into coupled states. At the same time, the controller ECU performs control to transmit driving force from the first motor MG1 and the second motor MG2 to each of the drive wheels 1 via the inverter, not illustrated.

At this time, the first motor MG1 is directly coupled to the left front wheel 1LF and the left rear wheel 1LR, and the second motor MG2 is also directly coupled to the right front wheel 1RF and the right rear wheel 1RR.

Consequently, when the controller ECU performs control to cause the first motor MG1 and the second motor MG2 to generate the same torque, the same driving force is distributed and transmitted to all of the drive wheels.

When the controller ECU performs control to cause the first motor MG1 and the second motor MG2 to generate different torques from each other, lateral torque vectoring can be performed on the left wheel side and the right wheel side.

Such control based on the first state is suitable for traveling off-road, for example, and can particularly enhance roadholding and other performance by the vehicle.

Second State

Figure 4:
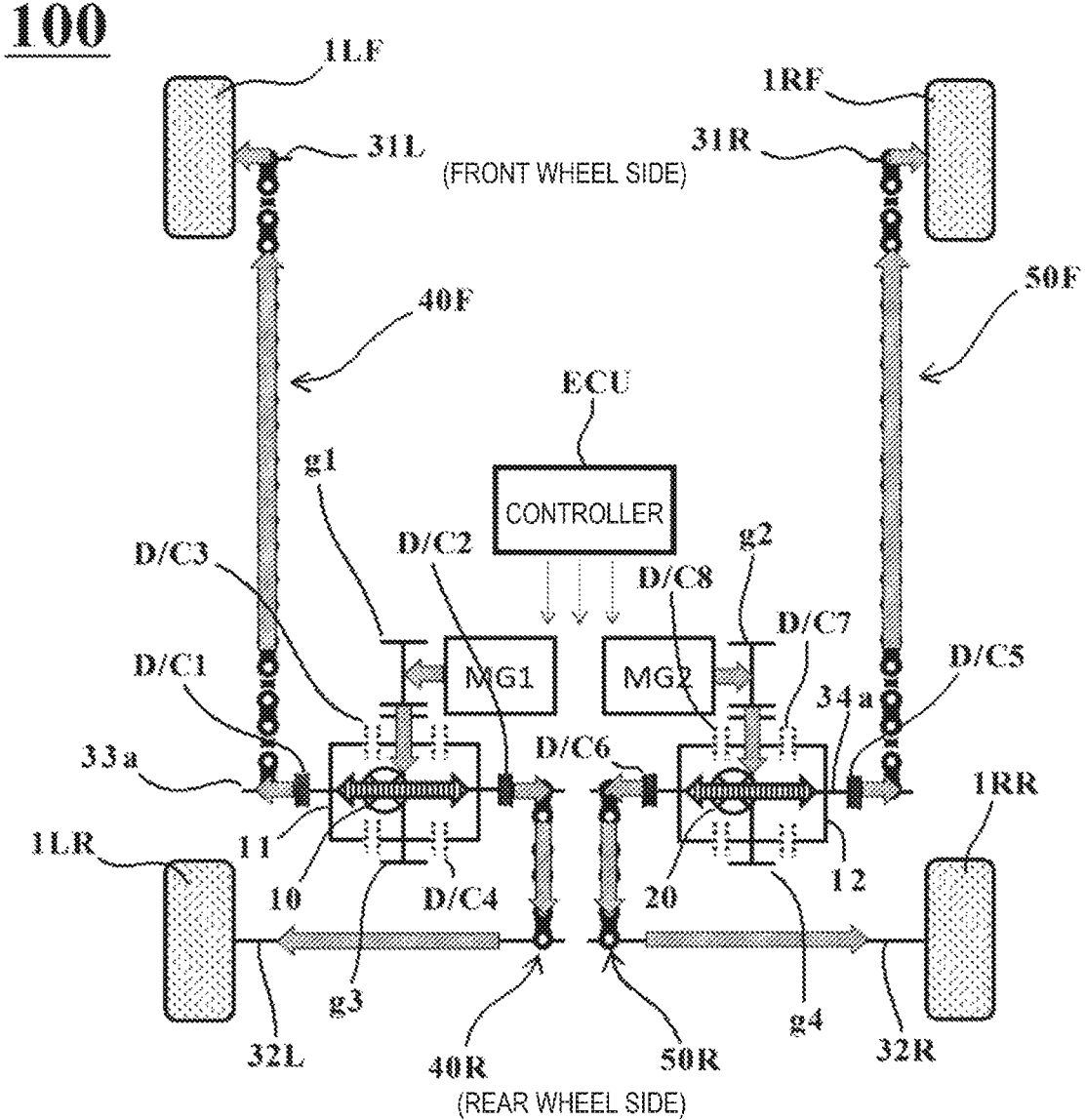
FIG. 4 is a diagram schematically illustrating how driving force from the electric motors is transmitted to the drive wheels in a second state.

As illustrated in FIG. 2, as a second state, all-wheel drive (AWD) travel may be exemplified in which a differential function of the front and rear wheels can be implemented in the electric-motor four-wheel drive vehicle 100. FIG. 4 illustrates a transmission state of driving force from the electric motors and a torque distribution state in the second state.

As obviously understood from these diagrams, the controller ECU controls the first decoupling mechanism D/C1, the second decoupling mechanism D/C2, the fifth decoupling mechanism D/C5, and the sixth decoupling mechanism D/C6 into coupled states. In addition, the controller ECU controls the third decoupling mechanism D/C3, the fourth decoupling mechanism D/C4, the seventh decoupling mechanism D/C7, and the eighth decoupling mechanism D/C8 into decoupled states.

At the same time, the controller ECU performs control to transmit driving force from the first motor MG1 and the second motor MG2 to each of the drive wheels 1 via the inverter, not illustrated.

At this time, the left front wheel 1LF and the left rear wheel 1LR receive driving force from the first motor MG1 via the first differential mechanism 10 and are rotated while allowing differential rotation between the left-side wheels. The right front wheel 1RF and the right rear wheel 1RR receive driving force from the second motor MG2 via the second differential mechanism 20 and are rotated while allowing differential rotation between the right-side wheels.

Consequently, when the controller ECU performs control to cause the first motor MG1 and the second motor MG2 to generate the same torque, all of the drive wheels are rotated while allowing differential rotation between the front and rear wheels although the sum of torques on the left wheel side is the same as on the right wheel side.

When the controller ECU performs control to cause the first motor MG1 and the second motor MG2 to generate different torques from each other, lateral torque vectoring can be also performed on the left wheel side and the right wheel side while allowing differential rotation between the front and rear wheels.

Such control based on the second state is suitable at the time of turning on a snowy road, for example, and can particularly enhance steerability, roadholding, and other performance by the vehicle.

Third State

Figure 5:
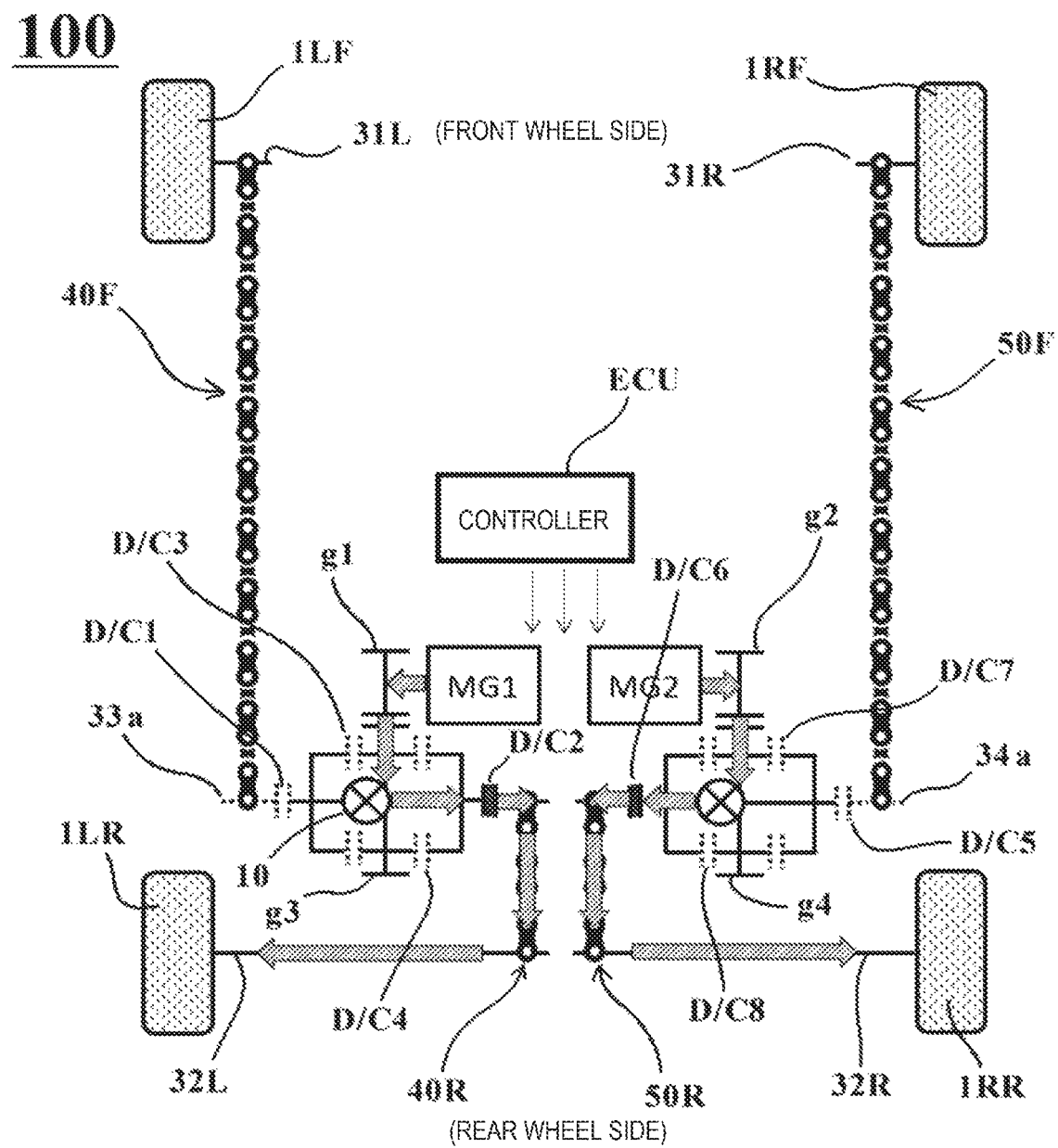
FIG. 5 is a diagram schematically illustrating how driving force from the electric motors is transmitted to the drive wheels in a third state.

As illustrated in FIG. 2, as a third state, rear-wheel drive travel by the electric-motor four-wheel drive vehicle 100 may be exemplified. FIG. 5 illustrates a transmission state of driving force from the electric motors and a torque distribution state in the third state.

As obviously understood from these diagrams, the controller ECU controls the second decoupling mechanism D/C2 and the sixth decoupling mechanism D/C6 into coupled states. In addition, the controller ECU controls the first decoupling mechanism D/C1 and the fifth decoupling mechanism D/C5 into decoupled states. At this time, the controller ECU may control the third decoupling mechanism D/C3, the fourth decoupling mechanism D/C4, the seventh decoupling mechanism D/C7, and the eighth decoupling mechanism D/C8 into either of decoupled states and coupled states.

At the same time, the controller ECU performs control to transmit driving force from the first motor MG1 and the second motor MG2 to the drive wheels 1 via the inverter, not illustrated.

At this time, the left rear wheel 1LR receives driving force from the first motor MG1 via the first intermediate shaft 33b, and the right rear wheel 1RR receives driving force from the second motor MG2 via the second intermediate shaft 34b.

Consequently, when the controller ECU performs control to cause the first motor MG1 and the second motor MG2 to generate the same torque, rear-wheel drive travel is implemented with the same torque on each of the right wheel side and the left wheel side.

When the controller ECU performs control to cause the first motor MG1 and the second motor MG2 to generate different torques from each other, lateral torque vectoring of the left rear wheel 1LR and the right rear wheel 1RR can be performed.

Such control based on the third state is suitable at the time of sport traveling and turning at high speed, for example, and can particularly enhance steerability during high-speed travel and such other performance by the vehicle.

Fourth State

Figure 6:
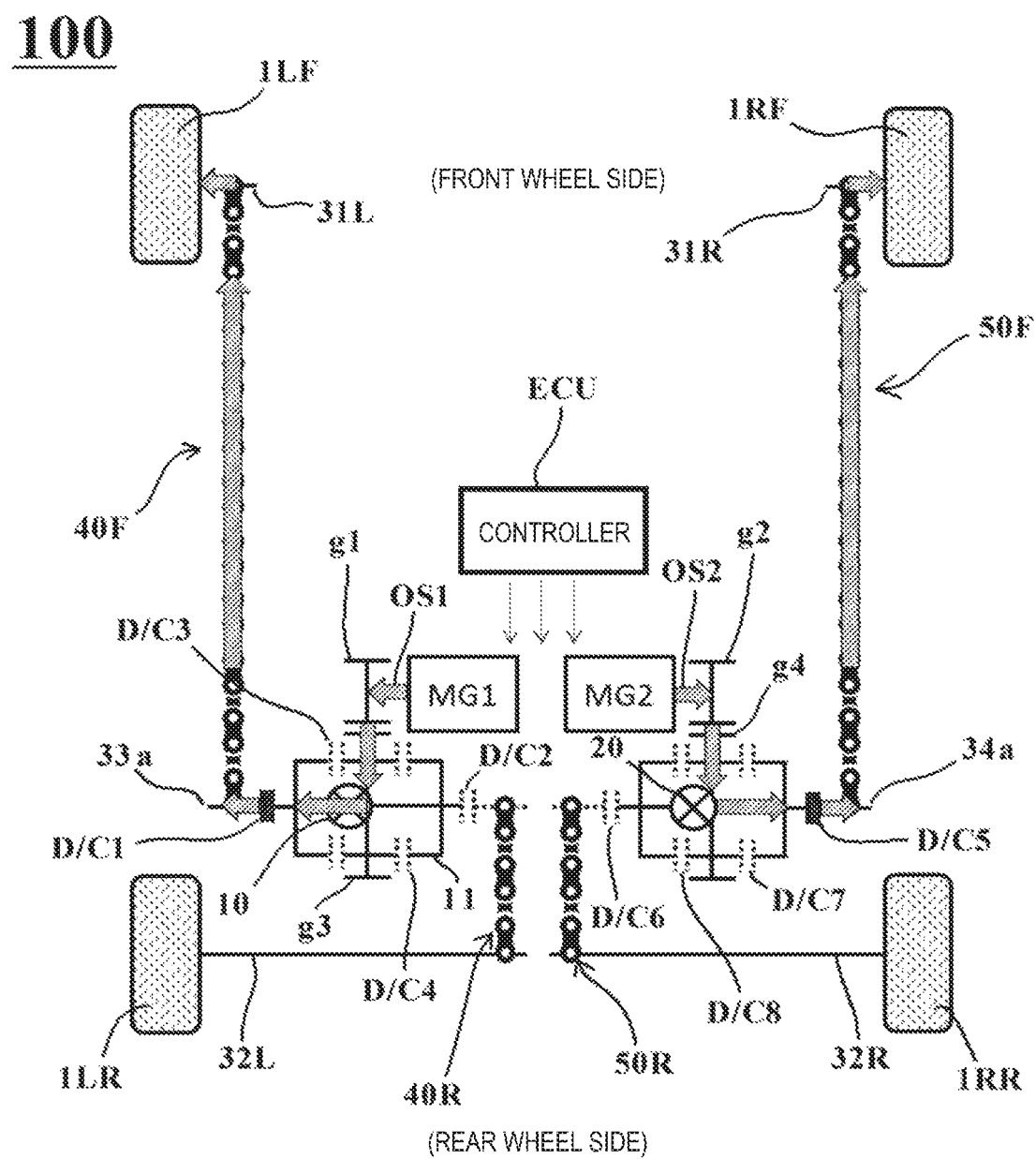
FIG. 6 is a diagram schematically illustrating how driving force from the electric motors is transmitted to the drive wheels in a fourth state.

As illustrated in FIG. 2, as a fourth state, front-wheel drive travel by the electric-motor four-wheel drive vehicle 100 may be exemplified. FIG. 6 illustrates a transmission state of driving force from the electric motors and a torque distribution state in the fourth state.

As obviously understood from these diagrams, the controller ECU controls the first decoupling mechanism D/C1 and the fifth decoupling mechanism D/C5 into coupled states. In addition, the controller ECU controls the second decoupling mechanism D/C2 and the sixth decoupling mechanism D/C6 into decoupled states. At this time, the controller ECU may control the third decoupling mechanism D/C3, the fourth decoupling mechanism D/C4, the seventh decoupling mechanism D/C7, and the eighth decoupling mechanism D/C8 into either of decoupled states and coupled states.

At the same time, the controller ECU performs control to transmit driving force from the first motor MG1 and the second motor MG2 to the drive wheels 1 via the inverter, not illustrated.

At this time, the left front wheel 1LF receives driving force from the first motor MG1 via the first intermediate shaft 33a, and the right front wheel 1RF receives driving force from the second motor MG2 via the second intermediate shaft 34a.

Consequently, when the controller ECU performs control to cause the first motor MG1 and the second motor MG2 to generate the same torque, front-wheel drive travel is implemented with the same torque on each of the right wheel side and the left wheel side.

When the controller ECU performs control to cause the first motor MG1 and the second motor MG2 to generate different torques from each other, lateral torque vectoring of the left front wheel 1LF and the right front wheel 1RF can be performed.

Such control based on the fourth state is suitable at the time of traveling at constant speed and turning at a curve on an ordinary road, for example, and can particularly enhance traveling stability during normal travel and such other performance by the vehicle.

Fifth State

Figure 7:
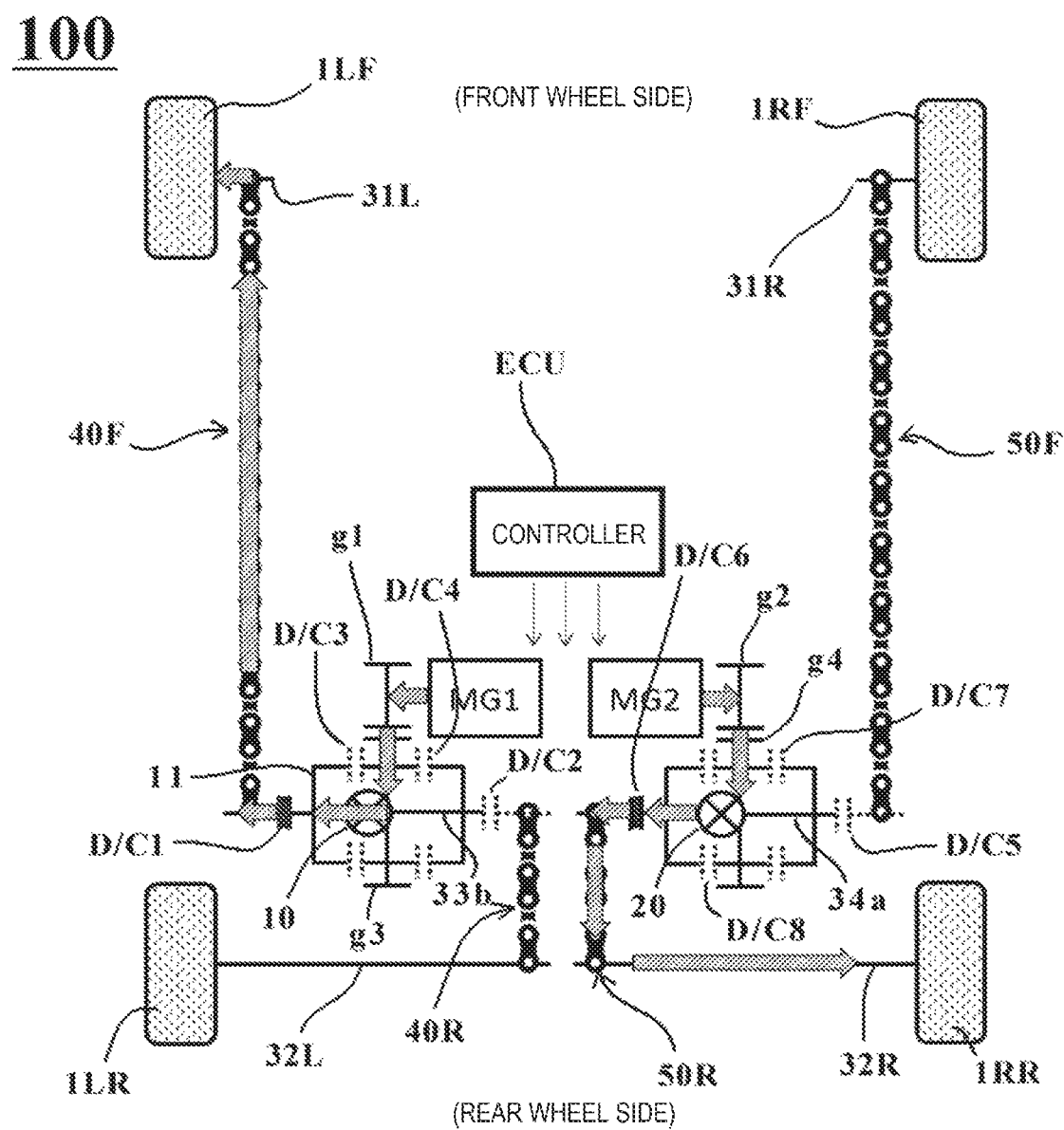
FIG. 7 is a diagram schematically illustrating how driving force from the electric motors is transmitted to the drive wheels in a fifth state.

As illustrated in FIG. 2, as a fifth state, two-wheel (cross) drive travel by the electric-motor four-wheel drive vehicle 100 may be exemplified. FIG. 7 illustrates a transmission state of driving force from the electric motors and a torque distribution state in the fifth state.

As obviously understood from these diagrams, the controller ECU controls the first decoupling mechanism D/C1 and the sixth decoupling mechanism D/C6 into coupled states. In addition, the controller ECU controls the second decoupling mechanism D/C2 and the fifth decoupling mechanism D/C5 into decoupled states. At this time, the controller ECU may control the third decoupling mechanism D/C3, the fourth decoupling mechanism D/C4, the seventh decoupling mechanism D/C7, and the eighth decoupling mechanism D/C8 into either of decoupled states and coupled states.

At the same time, the controller ECU performs control to transmit driving force from the first motor MG1 and the second motor MG2 to the drive wheels 1 via the inverter, not illustrated.

At this time, the left front wheel 1LF receives driving force from the first motor MG1 via the first intermediate shaft 33a, and the right rear wheel 1RR receives driving force from the second motor MG2 via the second intermediate shaft 34b.

Consequently, when the controller ECU performs control to cause the first motor MG1 and the second motor MG2 to generate the same torque, two-wheel drive travel is implemented with the same torque on each of the right wheel side and the left wheel side.

When the controller ECU performs control to cause the first motor MG1 and the second motor MG2 to generate different torques from each other, lateral torque vectoring of the left front wheel 1LF and the right rear wheel 1RR can be performed.

Such control based on the fifth state is suitable when the right front wheel 1RF and the left rear wheel 1LR are in a slippage state on a rough road, for example, and can particularly enhance roadholding and other performance in the special environment by the vehicle.

In the fifth state, although the two electric motors are used to drive the left front wheel 1LF and the right rear wheel 1RR, this is not to be construed in a limiting sense. The right front wheel 1RF and the left rear wheel 1LR may be driven. In this case, the controller ECU controls the second decoupling mechanism D/C2 and the fifth decoupling mechanism D/C5 into coupled states and controls the first decoupling mechanism D/C1 and the sixth decoupling mechanism D/C6 into decoupled states.

Drive Control Method of Electric-Motor Four-Wheel Drive Vehicle

Figure 8:
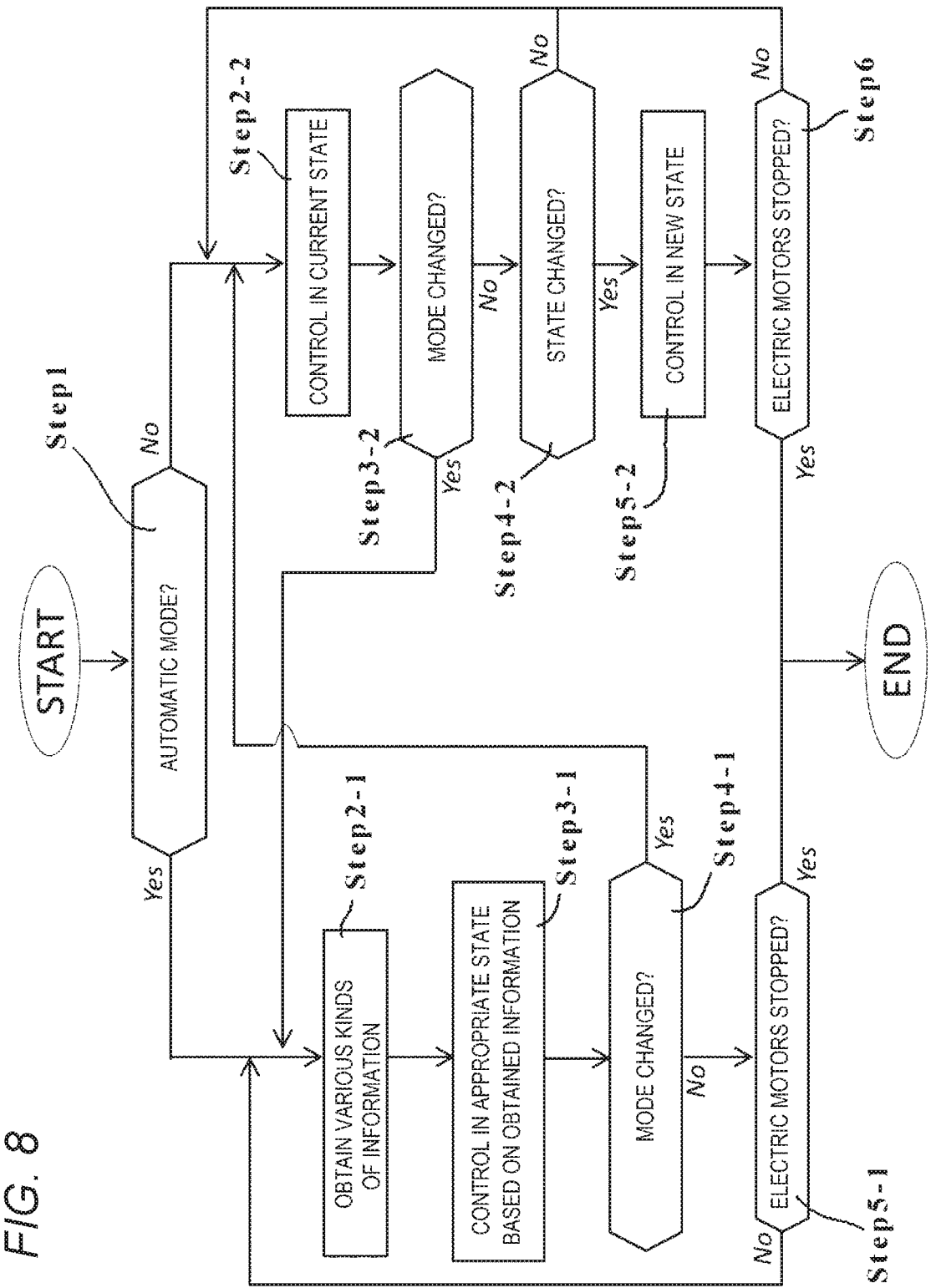
FIG. 8 is a flowchart of a drive control method of the electric-motor four-wheel drive vehicle according to the first embodiment.

Next, referring to FIG. 8, description will be made on a drive control method of the electric-motor four-wheel drive vehicle 100, which is performed by the controller ECU according to this embodiment. The following describes a case of appropriately selecting one from among the first to fifth states as an example of the torque distribution control by the controller ECU. However, the first to fifth states are merely examples. A sixth state, described later, for example, may be added, and other states may be adopted.

After a driver aboard the electric-motor four-wheel drive vehicle 100 starts the electric motors, the controller ECU first determines in Step 1 whether an automatic mode is set. In Step 1, when the automatic mode is determined as being set, processing proceeds to Step 2-1, and when the automatic mode is determined as being not set, the processing proceeds to Step 2-2.

In Step 2-1 with the automatic mode being set, under control of the controller ECU, various kinds of information are obtained from various kinds of sensors, such as a speed and acceleration sensor and a gyroscope sensor, and onboard devices, such as an onboard camera and a navigation system, that are provided for the electric-motor four-wheel drive vehicle 100. Examples of the information obtained in Step 2-2 include speed, acceleration, angular acceleration, vehicle speed pulse, image information, position information, and map information.

Next, in Step 3-1, under control of the controller ECU, an appropriate state is determined based on the obtained various kinds of information. More specifically, in one example, when the electric-motor four-wheel drive vehicle 100 is determined as being at a start based on the obtained vehicle acceleration information, the controller ECU controls each of the electric motors and each of the decoupling mechanisms so as to establish the first state. In another example, during traveling after an elapse of time from the start, and when the electric-motor four-wheel drive vehicle 100 is determined as being climbing a hill based on the map information, the controller ECU controls each of the electric motors and each of the decoupling mechanisms so as to establish the second state.

Thus, according to this embodiment, a traveling situation of the electric-motor four-wheel drive vehicle 100 is determined based on the information from the various kinds of sensors and onboard devices, and each of the electric motors and each of the decoupling mechanisms are controlled based on a result of this determination so as to perform appropriate torque distribution. This makes it possible to obtain both of high roadholding and high steering stability with respect to various road surface situations without making the driver perform particularly complicated operation. The traveling situation of the electric-motor four-wheel drive vehicle 100 is determined based on the information from the various kinds of sensors and onboard devices, whereby appropriate torque distribution can be performed. Thus, the driving forces are efficiently transmitted to the drive wheels by using the two electric motors.

Subsequently in Step 4-1, a determination is made as to whether the mode has been changed by a vehicle occupant such as the driver. More specifically, under control of the controller ECU, a determination is made as to whether the automatic mode has been switched to a manual mode. When it is determined that switching to the manual mode has been performed, the processing proceeds to Step 2-2. Otherwise, when it is determined that the mode has not been changed, a determination is made subsequently in Step 5-1 as to whether the electric motors have been turned off. When it is determined in Step 5-1 that the electric motors have not been turned off, control is performed to make the processing return to Step 2-1 and to recontinue the processing that follows Step 2-1.

Next, an example of starting in the manual mode will be described.

That is, when the manual mode is determined as being set in Step 1, control is started in a current state in Step 2-2.

Normally, the time when the electric motors are turned on and started corresponds to the vehicle start time. Thus, when the processing proceeds from Step 1 to Step 2-2, each of the electric motors and each of the decoupling mechanisms are controlled to establish the first state, for example. Alternatively, when the processing proceeds from Step 4-1 to Step 2-2, the control is continued while a state at the time is maintained.

Subsequently in Step 3-2, a determination is made as to whether the mode has been changed. Control is performed in such a manner that when it is determined that the mode has been changed, the processing proceeds to Step 2-1, and when it is determined that the mode has not been changed, the processing proceeds to Step 4-2.

In Step 4-2 after it is determined that the mode has not been changed, a determination is made as to whether the state has been changed by a vehicle occupant such as the driver. When it is determined that the state has been changed, each of the electric motors and each of the decoupling mechanisms are controlled to establish a newly selected state in Step 5-2. Alternatively, when it is determined in Step 4-2 that the state has not been changed, the processing returns to Step 2-2, and the control that follows Step 2-2 is continued.

After the control is started in the newly selected state in Step 5-2, a determination is made in Step 6 as to whether the electric motors are stopped. When it is determined that the electric motors are not stopped in Step 6, the processing returns to Step 2-2, and the control that follows Step 2-2 is recontinued.

In this manner, the drive control method of the electric-motor four-wheel drive vehicle according to this embodiment involves setting an appropriate state obtainable based on various kinds of information from the onboard sensors and devices when the automatic mode is selected. This enables efficient transmission of the driving forces to the drive wheels while maintaining high roadholding and high steering stability with respect to various road surface situations.

As has been described so far, with the drive apparatus for the electric-motor four-wheel drive vehicle 100 according to the first embodiment, the states are appropriately selected to implement efficient transmission of the driving force from the electric motors to the drive wheels while maintaining high roadholding and high steering stability with respect to various road surface situations.

It is noted that the controller ECU may perform regenerative charging of a battery, not illustrated, by selecting decoupled and coupled states of the first decoupling mechanism D/C1 to the eighth decoupling mechanism D/C8.

Second Embodiment

Electric-Motor Four-Wheel Drive Vehicle 110

Next, a configuration of an electric-motor four-wheel drive vehicle 110 according to a second embodiment of the disclosure will be described with reference to FIG. 9. The electric-motor four-wheel drive vehicle 110 in the second embodiment includes a ninth decoupling mechanism D/C9 and disposing the electric motors closer to the front wheels than in the first embodiment. The ninth decoupling mechanism. D/C9 is capable of coupling and decoupling the left wheel side and the right wheel side to and from each other.

Therefore, the same components as already described in the first embodiment are denoted with the same reference numerals and signs as in the first embodiment and will not be repeatedly described.

Figure 9:
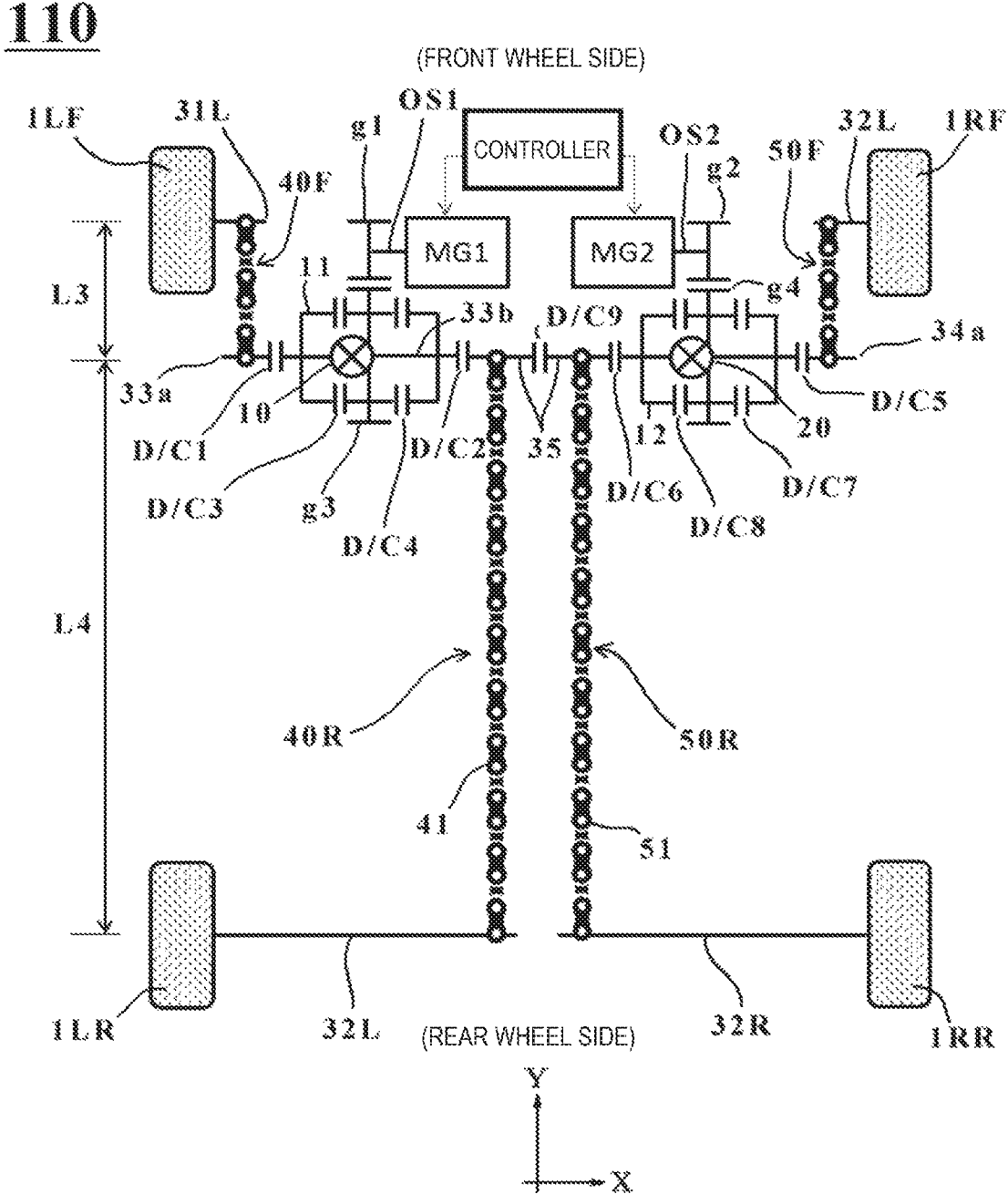
FIG. 9 is a block diagram illustrating a driving force transmission system in an electric-motor four-wheel drive vehicle according to a second embodiment.

As illustrated in FIG. 9, the electric-motor four-wheel drive vehicle 110 according to the second embodiment includes the ninth decoupling mechanism D/C9.

The ninth decoupling mechanism D/C9 couples and decouples a left-wheel drive shaft and a right-wheel drive shaft to and from each other. The left-wheel drive shaft drives the left front wheel 1LF and the left rear wheel 1LR, and the right-wheel drive shaft drives the right front wheel 1RF and the right rear wheel 1RR.

As illustrated in FIG. 9, in the second embodiment, the first intermediate shaft 33b is applied as the left-wheel drive shaft, and the second intermediate shaft 34b is applied as the right-wheel drive shaft. It is noted that the left-wheel drive shaft and the right-wheel drive shaft are not limited to the above-described combination. For example, the left front axle 31L and the right front axle 31R may be combined, and the left rear axle 32L and the right rear axle 32R may be combined.

In the second embodiment, as obviously understood from FIG. 9, the ninth decoupling mechanism D/C9 is disposed on a coupling shaft 35. This coupling shaft 35 may be integrally formed by the first intermediate shaft 33b and the second intermediate shaft 34b.

In the electric-motor four-wheel drive vehicle 110 according to the second embodiment, via the ninth decoupling mechanism D/C9, driving force from the first motor MG1 is transmitted to the right front wheel 1RF and the right rear wheel 1RR, and driving force from the second motor MG2 is transmitted to the left front wheel 1LF and the left rear wheel 1LR.

As illustrated in FIG. 9, a length L3 of the first sprocket mechanism 40F in the vehicle longitudinal direction in the second embodiment may be less than a length L4 of the first sprocket mechanism 40R in the vehicle longitudinal direction. Alternatively, in a similar manner to the first embodiment, the length L3 may be greater than the length L4.

Similarly, the length L3 of the second sprocket mechanism 50F in the vehicle longitudinal direction in the second embodiment may be less than the length L4 of the second sprocket mechanism 50R in the vehicle longitudinal direction. Alternatively, in a similar manner to the first embodiment, the length L3 may be greater than the length L4.

In the second embodiment, although the front and rear wheels receive driving force transmitted from the first intermediate shaft 33 via the respective sprocket mechanisms, this is not to be construed in a limiting sense. For example, while a known gear mechanism may be applied to the left front wheel 1LF, driving force may be transmitted to the left rear wheel 1LR using the first sprocket mechanism 40R. In such a manner, the sprocket mechanism may be applied to at least one of the front wheel or the rear wheel.

Sixth State

As a sixth state, limp home travel by the electric-motor four-wheel drive vehicle 110 may be exemplified. Specifically, although the two electric motors are mounted on the electric-motor four-wheel drive vehicle 110, it can be assumed that one of the electric motors malfunctions for some reason (in this example, the second motor MG2 is out of order due to a malfunction).

Figure 10:
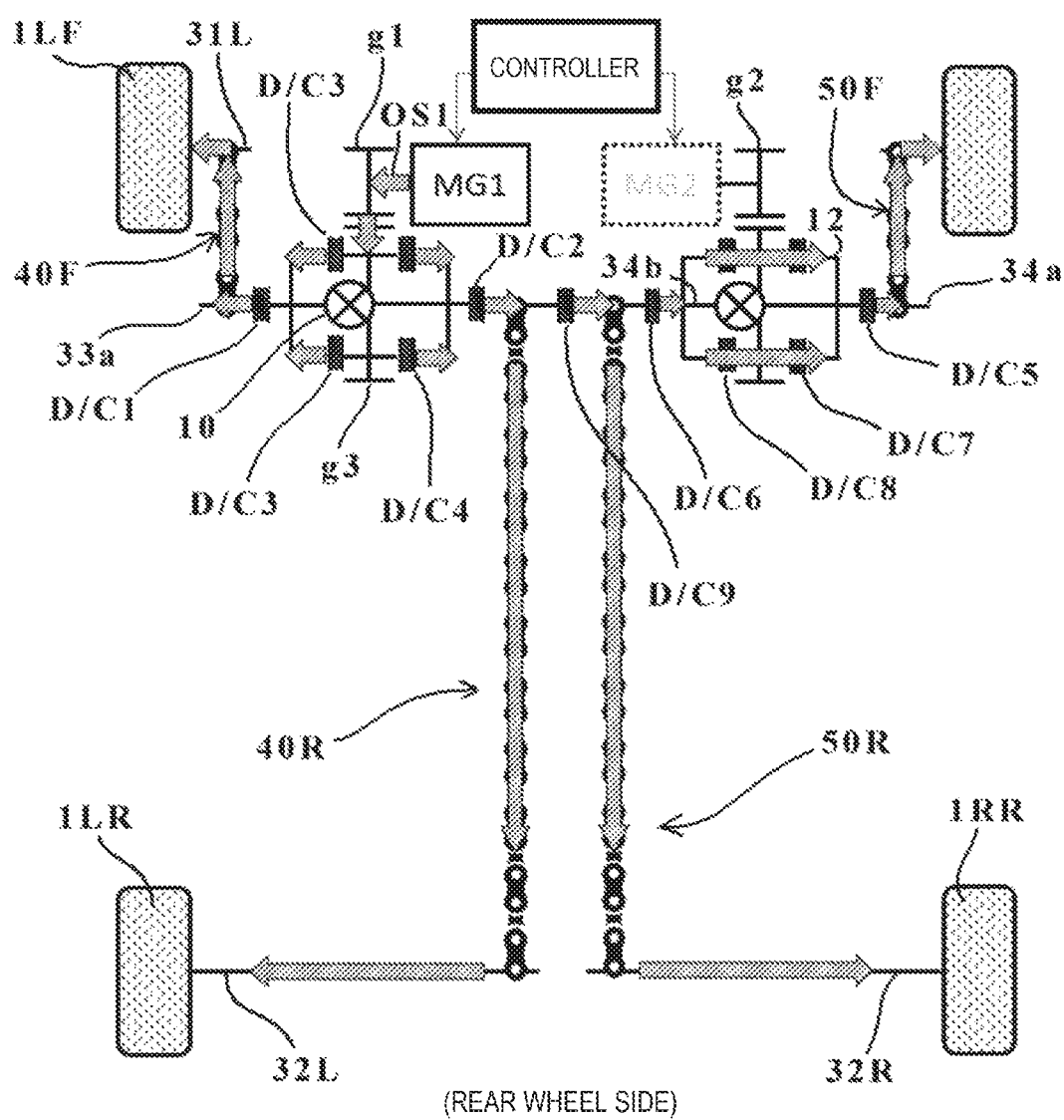
FIG. 10 is a diagram schematically illustrating how driving force from the electric motor is transmitted to the drive wheels in a sixth state.

FIG. 10 illustrates a transmission state of driving force from the electric motors and a torque distribution state in the sixth state.

As obviously understood from FIG. 10, the controller ECU controls all of the first decoupling mechanism D/C1 to the ninth decoupling mechanism D/C9 into coupled states, and also performs control to transmit driving force from the first motor MG1 to each of the drive wheels 1 via the inverter, not illustrated.

At this time, the left front wheel 1LF and the left rear wheel 1LR receive driving force from the first motor MG1, and the right front wheel 1RF and the right rear wheel 1RR can also receive driving force from the first motor MG1 via the ninth decoupling mechanism D/C9.

Consequently, even when the second motor MG2 becomes out of order for some unexpected reason, driving force can be transmitted from the first motor MG1 to all of the four wheels, thereby enabling the vehicle to more safely travel to a repair plant, for example.

Needless to say, although the second motor MG2 becomes out of order in this example, driving force can be similarly transmitted from the second motor MG2 to all of the four wheels even when the first motor MG1 becomes out of order.

It is noted that the foregoing embodiments are merely suitable examples of the disclosure, and components of the embodiments can be appropriately combined to implement a new structure or new control without departing from the subject matter of the disclosure.

For example, although neither a decelerator nor a transmission is provided for the first motor MG1 and the second motor MG2 in the foregoing embodiments, this is not to be construed in a limiting sense. A decelerator or a transmission may be provided for at least one of the electric motors.

The invention claimed is:

1. A drive apparatus for an electric-motor four-wheel drive vehicle, the drive apparatus comprising:
   a first motor capable of transmitting power to a left front wheel and a left rear wheel;
   a second motor capable of transmitting power to a right front wheel and a right rear wheel;
   a first differential mechanism coupled to the first motor, the first differential mechanism being configured to distribute the power from the first motor to the left front wheel and the left rear wheel;
   a second differential mechanism coupled to the second motor, the second differential mechanism being configured to distribute the power from the second motor to the right front wheel and the right rear wheel;
   a first decoupling mechanism interposed between the first differential mechanism and the left front wheel;
   a second decoupling mechanism interposed between the first differential mechanism and the left rear wheel;
   a third decoupling mechanism interposed between the first motor and the first decoupling mechanism, the third decoupling mechanism being capable of directly coupling the first motor and the left front wheel to each other;
   a fourth decoupling mechanism interposed between the first motor and the second decoupling mechanism, the fourth decoupling mechanism being capable of directly coupling the first motor and the left rear wheel to each other;
   a fifth decoupling mechanism interposed between the second differential mechanism and the right front wheel;
   a sixth decoupling mechanism interposed between the second differential mechanism and the right rear wheel;
   a seventh decoupling mechanism interposed between the second motor and the fifth decoupling mechanism, the seventh decoupling mechanism being capable of directly coupling the second motor and the right front wheel to each other; and
   an eighth decoupling mechanism interposed between the second motor and the sixth decoupling mechanism, the eighth decoupling mechanism being capable of directly coupling the second motor and the right rear wheel to each other.

2. The drive apparatus according to claim 1, wherein the first motor and the second motor are interposed in a space from drive shafts of the left front wheel and the right front wheel to drive shafts of the left rear wheel and the right rear wheel.

3. The drive apparatus according to claim 1, wherein respective output shafts the first motor and the second motor are disposed in respectively parallel to drive shafts of the left front wheel and the right front wheel.

4. The drive apparatus according to claim 2, wherein respective output shafts the first motor and the second motor are disposed in respectively parallel to drive shafts of the left front wheel and the right front wheel.

5. The drive apparatus according to claim 1, further comprising:
   a first intermediate shaft interposed in a space from the first motor to the left front wheel and the left rear wheel, the first intermediate shaft being capable of transmitting driving force from the first motor, wherein the first differential mechanism is disposed on the first intermediate shaft.

6. The drive apparatus according to claim 2, further comprising:
   a first intermediate shaft interposed in a space from the first motor to the left front wheel and the left rear wheel, the first intermediate shaft being capable of transmitting driving force from the first motor, wherein the first differential mechanism is disposed on the first intermediate shaft.

7. The drive apparatus according to claim 5, further comprising:
   first sprocket mechanisms interposed (i) between the first intermediate shaft and the left front wheel and (ii) between the first intermediate shaft and the left rear wheel, respectively, wherein
   the driving force from the first motor is transmitted to the left front wheel and the left rear wheel via the first sprocket mechanisms.

8. The drive apparatus according to claim 6, further comprising:
   first sprocket mechanisms interposed (i) between the first intermediate shaft and the left front wheel and (ii) between the first intermediate shaft and the left rear wheel, respectively, wherein
   the driving force from the first motor is transmitted to the left front wheel and the left rear wheel via the first sprocket mechanisms.

9. The drive apparatus according to claim 1, further comprising:
   a second intermediate shaft interposed in a space from the second motor to the right front wheel and the right rear wheel, the second intermediate shaft being capable of transmitting driving force from the second motor, wherein
   the second differential mechanism is disposed on the second intermediate shaft.

10. The drive apparatus according to claim 2, further comprising:
    a second intermediate shaft interposed in a space from the second motor to the right front wheel and the right rear wheel, the second intermediate shaft being capable of transmitting driving force from the second motor, wherein the second differential mechanism is disposed on the second intermediate shaft.

11. The drive apparatus according to claim 9, further comprising:

second sprocket mechanisms interposed (i) between the second intermediate shaft and the right front wheel and (ii) between the second intermediate shaft and the right rear wheel, respectively, wherein the driving force from the second motor is transmitted to the right front wheel and the right rear wheel via the second sprocket mechanisms.

12. The drive apparatus according to claim 10, further comprising:

second sprocket mechanisms interposed (i) between the second intermediate shaft and the right front wheel and (ii) between the second intermediate shaft and the right rear wheel, respectively, wherein the driving force from the second motor is transmitted to the right front wheel and the right rear wheel via the second sprocket mechanisms.

13. The drive apparatus according to claim 1, further comprising:

a ninth decoupling mechanism configured to couple and decouple a left-wheel drive shaft and a right-wheel drive shaft to and from each other, the left-wheel drive shaft being configured to drive the left front wheel and the left rear wheel, the right-wheel drive shaft being configured to drive the right front wheel and the right rear wheel, wherein driving force is transmitted from the first motor to the right front wheel and the right rear wheel via the ninth decoupling mechanism, and driving force is transmitted from the second motor to the left front wheel and the left rear wheel via the ninth decoupling mechanism.

14. The drive apparatus according to claim 2, further comprising:

a ninth decoupling mechanism configured to couple and decouple a left-wheel drive shaft and a right-wheel drive shaft to and from each other, the left-wheel drive shaft being configured to drive the left front wheel and the left rear wheel, the right-wheel drive shaft being configured to drive the right front wheel and the right rear wheel, wherein driving force is transmitted from the first motor to the right front wheel and the right rear wheel via the ninth decoupling mechanism, and driving force is transmitted from the second motor to the left front wheel and the left rear wheel via the ninth decoupling mechanism.

15. The drive apparatus according to claim 1, wherein a maximum output of the first motor and a maximum output of the second motor are equal to each other.

16. The drive apparatus according to claim 1, wherein a maximum output of the first motor and a maximum output of the second motor are equal to each other.

17. The drive apparatus according to claim 1, further comprising:

a controller configured to control coupling and decoupling of the first decoupling mechanism, the second decoupling mechanism, the third decoupling mechanism, the fourth decoupling mechanism, the fifth decoupling mechanism, the sixth decoupling mechanism, the seventh decoupling mechanism, and the eighth decoupling mechanism, wherein the controller controls output states of the first motor and the second motor, and coupling and decoupling of each of the decoupling mechanisms.

18. The drive apparatus according to claim 2, further comprising:

a controller configured to control coupling and decoupling of the first decoupling mechanism, the second decoupling mechanism, the third decoupling mechanism, the fourth decoupling mechanism, the fifth decoupling mechanism, the sixth decoupling mechanism, the seventh decoupling mechanism, and the eighth decoupling mechanism, wherein the controller controls output states of the first motor and the second motor, and coupling and decoupling of each of the decoupling mechanisms.

\* \* \* \* \*